Patented Jan. 6, 1925.

1,521,813

UNITED STATES PATENT OFFICE.

EMIL HORNSTEIN, OF MOEDLING, NEAR VIENNA, AUSTRIA.

ARTIFICIAL STONE.

No Drawing.   Application filed August 18, 1921.  Serial No. 493,469.

*To all whom it may concern:*

Be it known that I, EMIL HORNSTEIN, a citizen of the Republic of Austria, residing at Moedling, near Vienna, Republic of Austria, have invented new and useful Improvements in Artificial Stones, of which the following is a specification.

The invention relates to artificial stones and preferably to such stones which are produced from a mixture of infusorial earth (kieselguhr), calcium hydrate and fibrous materials which mixture is hardened in steam. These stones, which have such small strength that they cannot be utilized for building construction, have only been used for insulating purposes. The known concrete and lime sandstones, also hardened in steam and which latter consists of sand and lime and eventually also concrete, have again a pronounced stone character, great strength but also a great specific gravity which renders their use for building purposes disadvantageous. They also lack elasticity and the capacity of having objects secured thereto by nails as possessed by stone-wood or similar products which are obtained by hardening a mixture of Portland cement with or without thinning means with the addition of organic fibrous materials, especially saw dust. These stones, however, possess little strength.

The object of the present invention consists therein to produce an artificial stone material and a process for producing the same. The stone material as produced by the invention is suitable for objects of any kind and consists of a hardened mixture of hydraulic binding means hardened after binding in high pressure steam, such as concrete and a comparatively great quantity of infusorial earth (kieselguhr or diatomaceous earth), lime and particles of wood, saw dust or the like. They have established that the stones attain a great strength in spite of the addition of kieselguhr and particles of wood.

The specific gravity of this artificial stone material is considerably less than that of the known lime sandstone or cementstone and the products are furthermore capable of being nailed and cut or sawed like wood.

As an example the following may serve: 18.5 parts by weight of cement, 34.5 parts by weight of kieselguhr, 18.5 parts by weight of lime, 28.5 parts by weight of particles of wood, saw dust or the like.

The artificial stone mass may be easily formed and this form is retained unchanged until completion in contradistinction from artificial stones which must be burnt. For this reason form parts of complicated nature, such as roofstone, can be produced quickly. The products are impervious to water and this property can be enhanced by adding to the raw mass asphalt, pitch, rosin or the like in powdeerd form. The great strength of the product permits its application as a building stone. Thus building blocks, plates, carriers and the like may be produced. Since it was found that iron reinforcements after hardening by steaming adhere in the mass the same as concrete, reinforced fire proof building blocks may be produced which are easily adapted to substitute reinforced concrete and are superior to the same on account of less weight and wooden-like properties.

Furthermore it is also possible to produce from the same artificial stone mass so called light stones by adding to the raw mass vaporizable substances which are known per se in all other artificial stone masses. As an addition for such purposes naphtalin is especially suitable which has the advantage that after the release from the artificial stone mass it may be recovered in order to be repeatedly used as a former for pores; since by the steam hardening the heating of the objects is necessary, this heating will also be employed for the ejection of the addition for forming pores so that the hardening and the formation of pores may be carried out in one operation. Such light stones have the advantage over other known stones that they retain their form in the process of producing the same and do not show cleavages so that they are qualified to be used for insulation purposes.

The mentioned additions for the raw mass consisting of cement, kieselguhr, lime and particles of wood may be employed singly or in various combinations also for the last mentioned light stone mass. The quantities of the various ingredients may, of course, be added to suit the special requirements of employment.

I claim:

1. The method of producing artificial stone including the steps of mixing kieselguhr, lime, cement and particles of wood in such proportion that the total of the parts by weight of kieselguhr and particles of wood is at least as great as that of lime and cement to impart to the material properties of wood, forming the mass, and hardening it in high pressure steam.

2. The method of producing artificial stone including the steps of mixing kieselguhr, lime, cement, particles of wood and a resin to render the artificial stone waterproof in such proportion that the total of the parts by weight of kieselguhr and particles of wood is at least as great as that of lime and cement, forming the mass, and hardening it in high pressure steam.

3. As a composition of matter, an artificial stone comprising kieselguhr, lime, cement and particles of wood in such proportion that the total of the parts by weight of kieselguhr and particles of wood is at least as great as that of lime and cement to impart properties of wood to the material, the mixture being hardened in high pressure steam.

4. As a composition of matter, an artificial stone comprising kieselguhr, lime, cement, particles of wood and a resin to render the artificial stone waterproof in such proportion that the total of the parts by weight of kieselguhr and particles of wood is at least as great as that of lime and cement, the mixture being hardened in high pressure steam.

In witness whereof I affix my signature.

DR. EMIL HORNSTEIN.